(12) United States Patent
Tam (10) Patent No.: US 8,745,505 B2
(45) Date of Patent: *Jun. 3, 2014

(54) WEB BASED DESKTOP ENVIRONMENT

(75) Inventor: Terry Tam, Ottawa (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 462 days.

This patent is subject to a terminal disclaimer.

(21) Appl. No.: 12/928,388

(22) Filed: Dec. 10, 2010

(65) Prior Publication Data

US 2012/0151365 A1 Jun. 14, 2012

(51) Int. Cl.
 *G06F 3/00* (2006.01)
(52) U.S. Cl.
 USPC ............ 715/738; 715/234; 715/742; 715/760
(58) Field of Classification Search
 CPC ..................... G06F 17/3089; G06F 17/30873
 USPC .................................. 715/738, 234, 742, 760
 See application file for complete search history.

(56) References Cited

U.S. PATENT DOCUMENTS

| | | | |
|---|---|---|---|
| 6,341,314 B1 * | 1/2002 | Doganata et al. ............. | 709/229 |
| 6,571,245 B2 * | 5/2003 | Huang et al. .................. | 1/1 |
| 7,155,490 B1 * | 12/2006 | Malmer et al. ................ | 709/217 |
| 7,620,911 B2 * | 11/2009 | Webb ............................ | 715/809 |
| 2003/0184583 A1 * | 10/2003 | Lim ............................... | 345/738 |
| 2006/0123353 A1 * | 6/2006 | Matthews et al. ............. | 715/779 |
| 2006/0259586 A1 * | 11/2006 | Wood et al. ................... | 709/219 |
| 2007/0101297 A1 * | 5/2007 | Forstall et al. ................ | 715/841 |
| 2008/0066078 A1 * | 3/2008 | Rathod et al. ................. | 719/311 |
| 2009/0083655 A1 | 3/2009 | Beharie et al. | |

FOREIGN PATENT DOCUMENTS

WO  WO 03/003239 A1  1/2003

OTHER PUBLICATIONS

Ramesh Srinivasan, "Show the Window Menu (Restore, Minimize, Close) for Taskbar Icons in Windows", Jan. 19, 2009, winhelponline.com, pp. 1-3.*
Marius Nestor: "eyeOS Review—The best Web operating system!" Feb. 17, 2009, retrieved from Internet: web.archive.org/web/20090217174644/http://softpedia.com/reviews/linus/eyeOS . . . .
Admin: "Visual Task Switcher Full Android Download v1.1" Sep. 24, 2010, pp. 1-4; XP002636253—retrieved from Internet:getandroidstuff.com/visual-task-switcher-full-android-download.
Google Inc: "Android 2.2 User's Guide" May 20, 2010, pp. 1,2,19-22,46,47, XP002635195—retrieved from Internet: sites.google.com/site/droidlife69/home/AndroidUsersGuide.pdf?attr . . . .

* cited by examiner

*Primary Examiner* — Kieu Vu
*Assistant Examiner* — Asteway T Gattew (57) ABSTRACT

A web based desktop environment is disclosed. The desktop environment comprises a work area configured to display application windows in a web browser operating on a computer server. A resident application bar is displayed adjacent the work area and configured to display only icons for resident desktop applications. A power bar resident desktop application is configured to launch web applications to be displayed in the work area. A task board operating in the power bar resident desktop application comprises a vertically resizable two dimensional window located at a selected edge of the work area. The task board is configured to display a web application icon for each web application launched in the power bar resident desktop application.

18 Claims, 11 Drawing Sheets

WEB BASED DESKTOP ENVIRONMENT

BACKGROUND

A web desktop is a desktop environment that can be embedded in a web browser or similar client application. The web desktop can be used to integrate web applications, web services, client-server applications, application servers, and applications on a local client into a desktop environment using the desktop metaphor. A web desktop can be a virtual desktop running in a web browser. The applications, data, files, configuration, settings, and access privileges can reside remotely over the network. This allows much of the computing to take place remotely.

As the desktop metaphor has evolved over the years, the abilities of the desktop have advanced. Unfortunately, with the advances has come a certain amount of feature bloat. Superfluous and unnecessary features in many types of desktops can require excessive amounts of processor power and memory use. In addition, in a web desktop feature bloat can cause an undesirable amount of information to be communicated over a network. When a large number of computing devices connected to a network are using a web desktop, this excess communication can be a burden to the network.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter. The following definitions are provided for clarity of the overview and embodiments described below.

A desktop environment embedded in a web browser or similar client application is commonly referred to as a web desktop. The web desktop can be a useful tool to integrate web applications, web services, client-server applications, application servers, and applications on a local client into a desktop environment using the desktop metaphor. A web desktop can be a virtual desktop running in a web browser. The applications, data, files, configuration, settings, and access privileges can reside remotely over the network. This allows much of the computing to take place remotely. The use of a simplified web desktop can reduce the amount of information that is communicated over a network. In addition, a simplified web desktop can provide a larger work area to display desired applications and reduce the amount of training needed to operate the web desktop.

Figure 1:
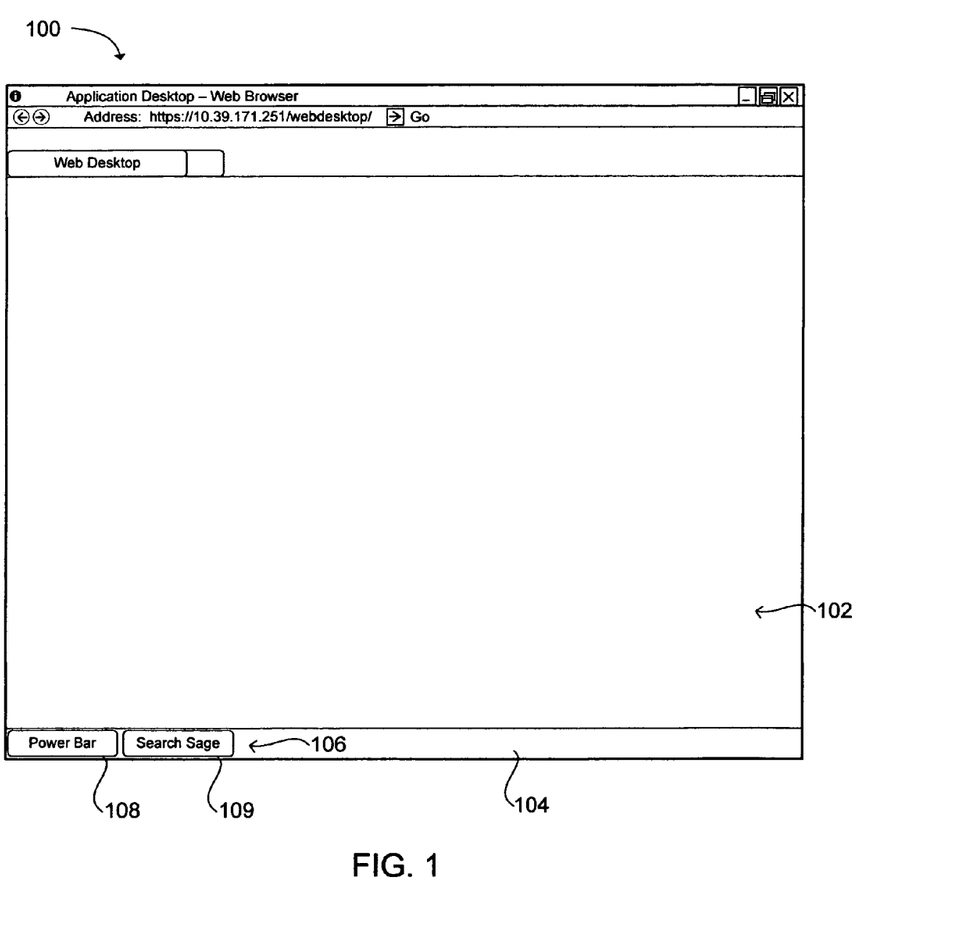
FIG. 1 illustrates an example of a desktop environment embedded in a web browser in accordance with an embodiment of the present invention.

In accordance with one embodiment of the present invention, FIG. 1 provides an example illustration of a desktop environment embedded in a web browser to form a web desktop 100. The web desktop is comprised of a work area 102 and a resident application bar 104. The work area can include a customizable background image, if desired.

In one embodiment, the resident application bar 104 is used only to display resident icons 106 for resident desktop applications that are configured to operate persistently with the web desktop 100. In other words, the resident desktop applications are launched at the same time as the desktop environment and can only be terminated when the web desktop is terminated. Each resident icon 106 can be limited in functionality. While typical application icons can be used to accomplish functions such as maximizing, minimizing, moving, and resizing a window associated with an icon's application, the resident icons can be limited in functionality to the operations of maximizing or minimizing the resident desktop application. Thus, each resident desktop application can only be maximized or minimized, thereby enabling only a single resident desktop application to be viewed at any one time using the web desktop 100.

In another embodiment, the web desktop can be configured to enable multiple resident desktop applications to be maximized and viewed simultaneously in the work area 102. For instance, if two resident desktop applications are maximized, the user may be given the option to split the desktop and view both resident desktop applications. While the resident desktop of FIG. 1 does not include scrollbars, it is possible to add horizontal or vertical scrollbars to increase the area in which the resident desktop application windows can be rendered.

One resident desktop application that can be launched with the web desktop 100 is the Power Bar resident desktop application 108. The Power Bar resident desktop application is a web application configured as an application launcher with active task management. Another resident desktop application that can be launched with the web desktop is the Search Sage resident desktop application 109. The search sage application enables a user to launch applications based on a search of available applications.

The resident icons 106 for the resident desktop applications 108, 109 can be displayed on the resident application bar 104 in any order. Each icon can act as a toggle switch, enabling the associated resident desktop application to be maximized or minimized by selecting the resident icon. In the present application, resident icons with no background represent a minimized application, while resident icons with a dotted background represent a maximized application. This is done for illustrative reasons only and is not intended to be limiting.

The Power Bar resident desktop application 108 is a web application launcher that enables a user to launch multiple web applications in individual windows within the web desktop 100 work area 102. A web application is a computer software application, such as a Java applet that can be hosted in a web browser or similar type of environment. A web application may be written in a language that is supported by a web browser. Popular client side languages include scripting languages such as JavaScript and VBScript. Server side languages, such as PERL and PHP, may also be used. The web application is typically reliant on a common web browser to render the application executable. Any type of common web browser that supports the web application language may be used.

The web applications can be stored on a server. The server may be a local server, a server on a local area network, or a server located in a cloud and accessible through an internet connection. The server may be a physical server, or a virtual server.

Figure 2:
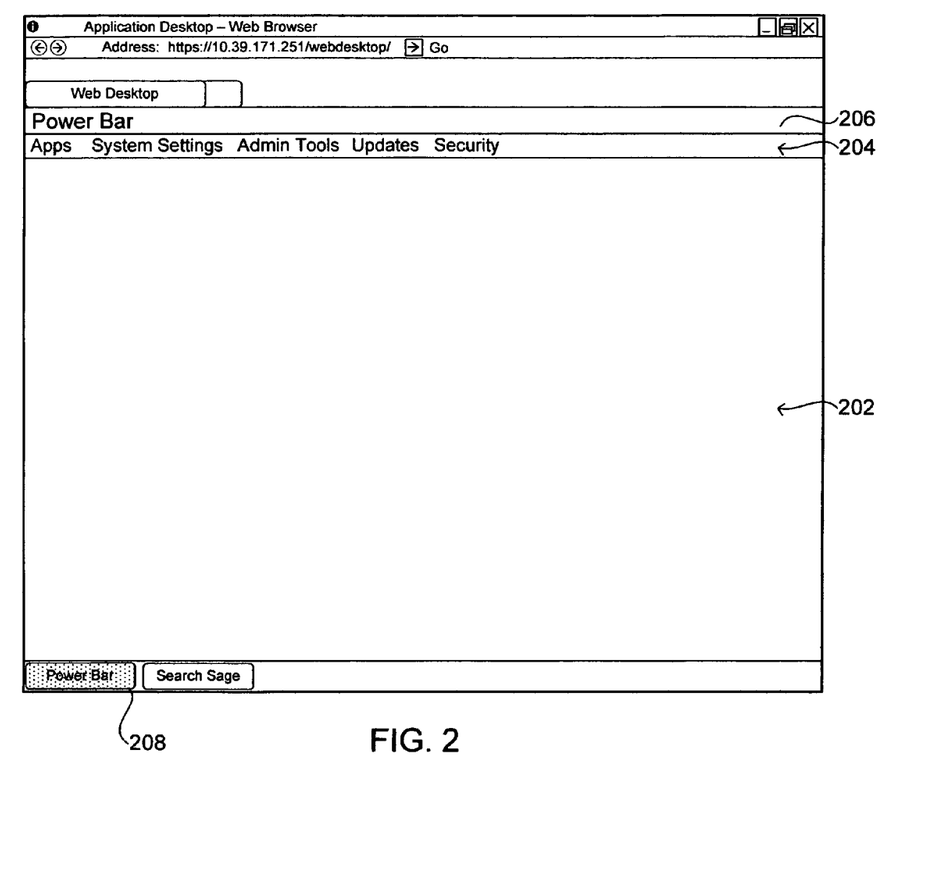
FIG. 2 illustrates an example of a Power Bar resident desktop application operating in the desktop environment in accordance with an embodiment of the present invention.

FIG. 2 provides one example illustration of the Power Bar resident desktop application 208 operating in the web desktop. The window displaying the Power Bar resident desktop application is comprised of a work area 202, a menu bar 204, and a header 206. The menu selections illustrated on the menu bar in FIG. 2 are provided for illustration only and are not intended to be limiting. The menu bar can be customized with menu items to operate the web applications desired by a customer.

In one embodiment, the menu bar 204 can be a standard pull down menu with sub-menuing capability. For instance, a user may select or mouse-over a desired item on a menu bar which can result in a sub-menu being displayed, enabling the user to select an item on the sub-menu. The menus and sub-menus can be used to enable the user to open desired web applications. Other graphical interfaces may be used to allow a user to select a desired application. For example, selectable applications may be organized using tabs, ribbons, or another graphical organization instrument.

Figure 3:
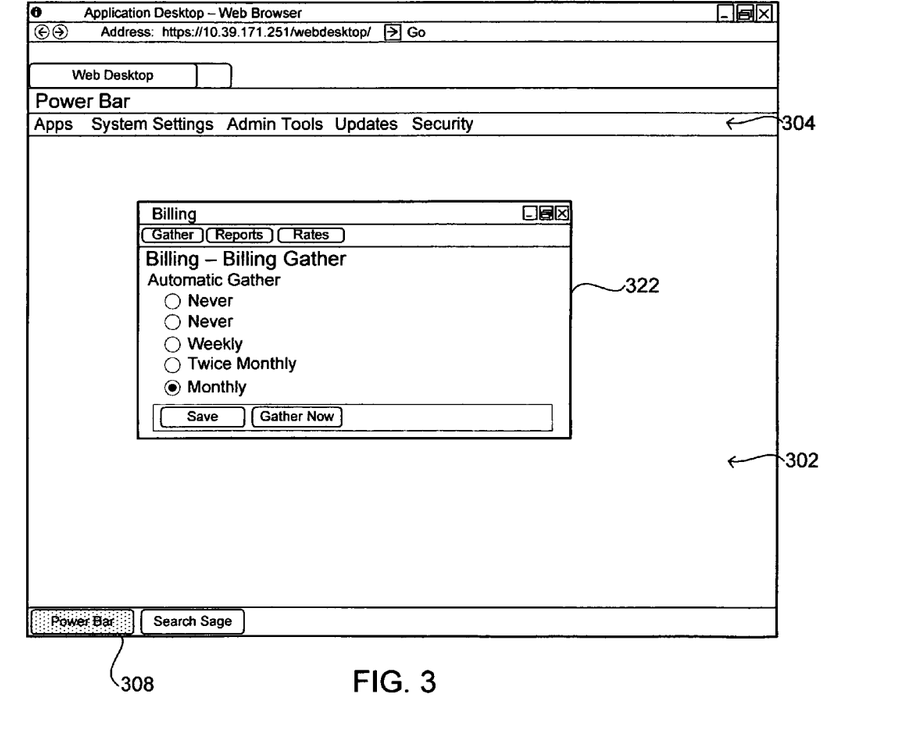
FIG. 3 illustrates an example of a web application launched in the Power Bar resident desktop application in accordance with an embodiment of the present invention.

FIG. 3 provides one example of a web application 322 that can be launched in the Power Bar resident desktop application 308 using a graphical user interface such as the menu bar 304. The window associated with the web application can be displayed in the work area 302 of the Power Bar resident desktop application. The Power Bar resident desktop application can be used to launch a plurality of different web applications. Each web application that is launched can display at least one window in the work area. The number of windows that can be displayed in the work area is limited only by the amount of memory and the graphical processing power of the computer server that the web desktop is operating on.

Figure 4:
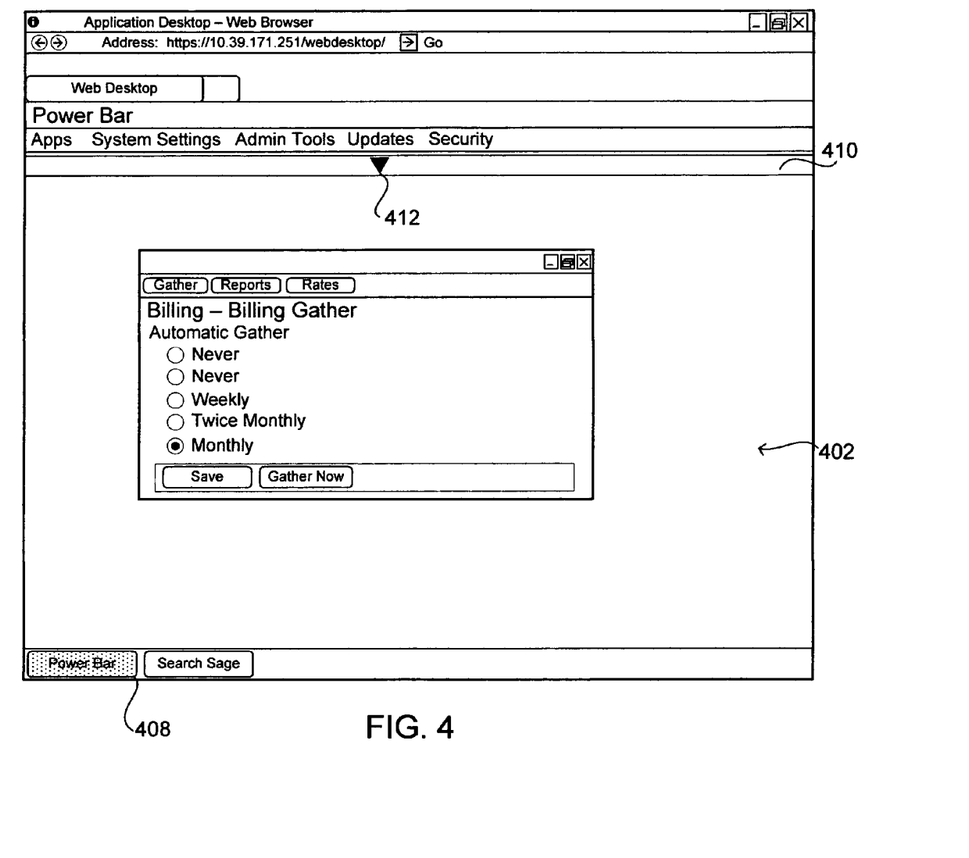
FIG. 4 illustrates an example of a task board operating in the Power Bar resident desktop application in accordance with an embodiment of the present invention.

In one embodiment, the Power Bar resident desktop application 408 can further comprise a task board 410 that is configured to enable a user to select and control the display of each window launched using the Power Bar resident desktop application, as illustrated in the example of FIG. 4. The task board is a scrollable two dimensional window that contains the application icon of every web application that is launched using the Power Bar resident desktop application. The task board can be located at a selected edge of the work area 402 and configured to display a web application icon for each web application that has been launched in the Power Bar resident desktop application 408. For instance, the task board may be located at the top of the work area 402. Alternatively, the task board may be located at the bottom, left side, or right side of the work area.

Figure 5:
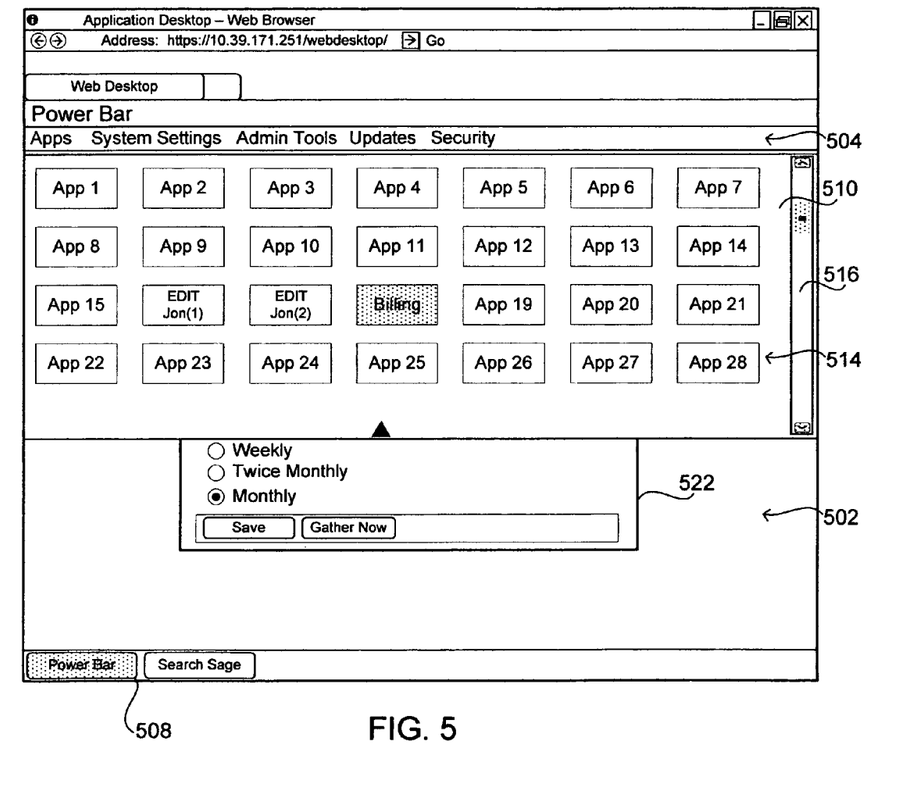
FIG. 5 illustrates an example of the task board operating in the Power Bar resident desktop application in an open mode in accordance with an embodiment of the present invention.

The task board 410 is a collapsible window that enables the work area 402 of the Power Bar resident desktop application 408 to be maximized for displaying graphical interfaces associated with launched web applications. FIG. 4 displays an example of the task board in a closed position. An active region 412 on the task board can be activated using a mouse or other type of graphical selection device to display the task board in an opened position, as illustrated in FIG. 5.

The task board 510 in the opened position can display a plurality of rows of application icons 514 associated with open web applications in the Power Bar resident desktop application 508. The icons can be named or numbered to allow a user to easily associate the application icon with its web application. The task board can be vertically resized by a user to display a desired number of rows of application icons. The work area 502 can be displayed below the task board. The work area may also be covered by the task board when the task board is in the opened position.

The display of a window in the work area 502 can be controlled using either controls on the window itself, or using the application icon 514 associated with the window. For instance, FIG. 5 shows that the application icon associated with the "Billing" web application of FIG. 3 is depressed, thereby displaying the window 522 for the Billing web application in the work area. The size of the window may be expanded or reduced by selecting a "resize" option using the application icon associated with the Billing web application. Alternatively, the creator of the web application may design the window to have a fixed size.

The application icon 514 can be used to perform a number of actions on its associated web application window, such as maximize, minimize, resize, move, and so forth. A user can select the desired action by selecting the application icon in the task board 510. For example, in one embodiment a desired action may be selected by right-clicking on the application icon. Other selecting means may be used as well, such as double clicking using a mouse, or tapping or double tapping using a touch screen. Additional selecting means may also be used, as can be appreciated.

The task board 510 can include a vertical scrollbar 516. The vertical scrollbar allows an unlimited number of application icons 514 to be displayed within the task board. While a vertical scrollbar is illustrated, a horizontal scrollbar may be used either alone or in conjunction with the vertical scrollbar. In addition, other scrolling means, such as a touch or swipe on a touch screen, may be used as well.

The application icons 514 in the task board 510 can be organized using a desired organizational method. For instance, the icons may be displayed based on the order in which a web application is launched, alphabetically based on a name of the web application, ordered by the amount of time that a web application is used relative to other opened applications, ordered based on when the web application was created, and so forth. In one embodiment, the settings for the task board organization can be made using the menu bar 504 of the Power Bar resident desktop application 508.

The Power Bar resident desktop application 508 can also be configured to enable multiple copies of the same file or application to be opened. Since the copies are opened at different times, they are referred to as different temporal instances of a web application. The task board 510 shows two application icons named "EDIT Jon(1)" and "EDIT Jon(2)". By opening two or more windows of the same application, the user can experiment with settings and have the ability of multiple level roll backs, even when the application does not support rollback. For instance, the first window (EDIT Jon (1)) may be left untouched with the original settings of a managed object. The second window (EDIT Jon(2)) can contain new settings that the user is trying out. At any time, the user can apply the original settings again from the first window if the new settings did not work as desired.

Figure 6A:
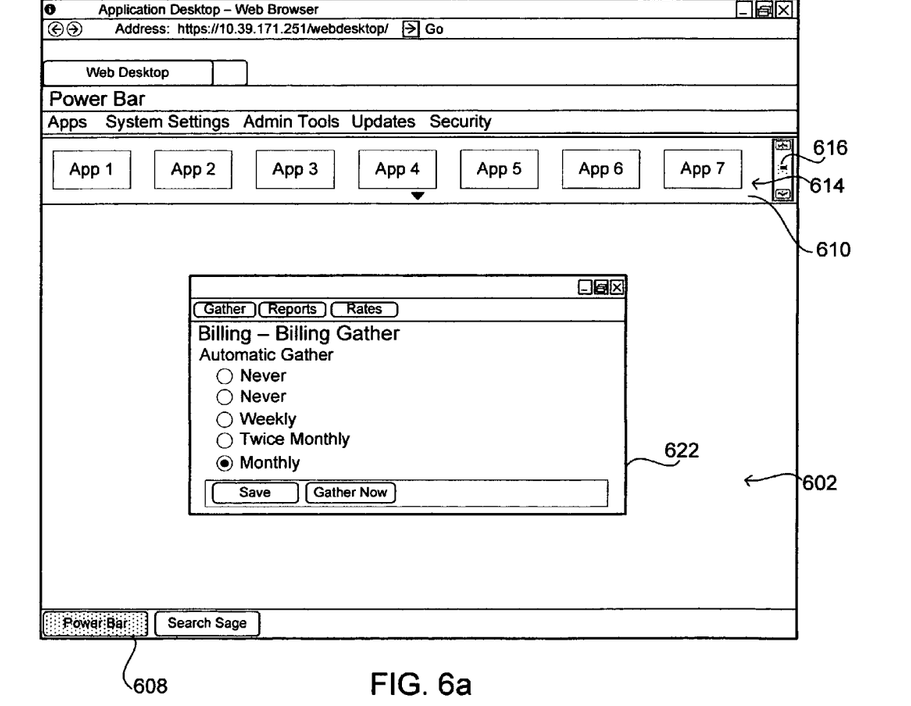
FIG. 6a illustrates an example of the task board as a scrollable window showing a single row of application icons in accordance with an embodiment of the present invention.

In one embodiment, the task board 610 can be implemented as a scrollable window showing a single row of application icons 614, as shown in the example illustration of FIG. 6a. The scrollable window can include a scrollbar 616 that enables the user to view adjacent rows of icons by clicking or selecting up or down on the scrollbar. Implementing the task board as a single row enables the work area 602 to be maximized for viewing open web applications 622 in the Power Bar resident desktop application 608.

In one embodiment, the task board 610 can be implemented in each resident desktop application to enable a user to control a display of web applications operating in the resident desktop application.

Figure 6B:
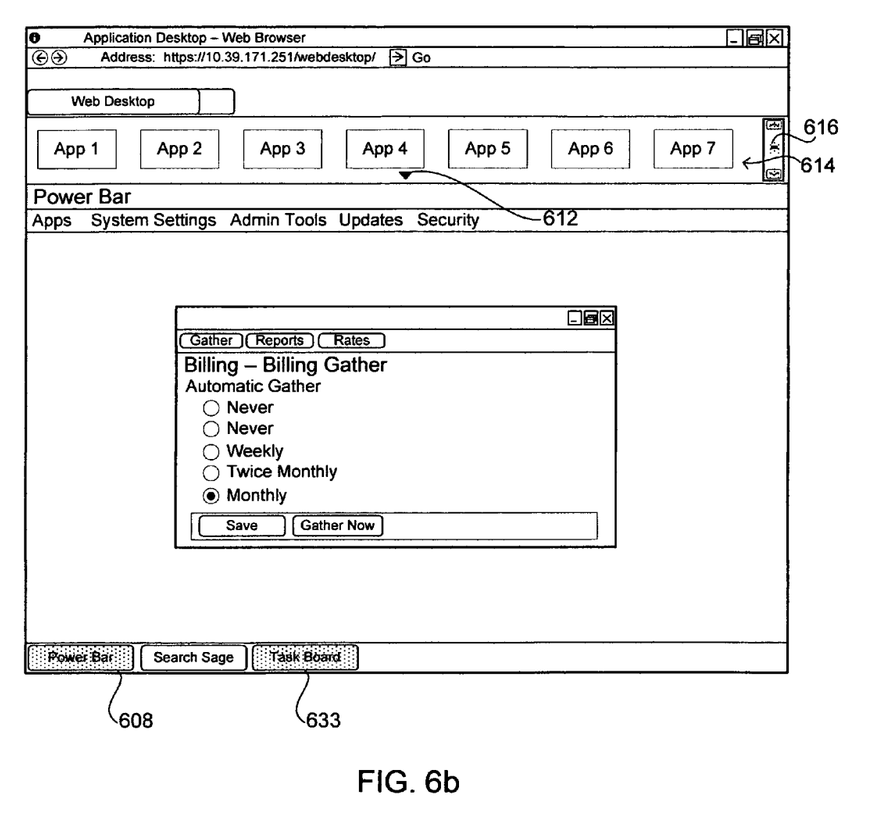
FIG. 6b illustrates an example of a task board resident desktop application having a scrollable window in accordance with an embodiment of the present invention.

Alternatively, in another embodiment, the task board 633 can be a resident desktop application itself, as shown in the example illustration of FIG. 6b. In this embodiment, the task board can be located adjacent to the maximized resident desktop application. For instance, FIG. 6b shows the task board resident desktop application 633 located above the Power Bar resident desktop application 608. The task board may also be located below, or to one side of the maximized resident desktop application(s).

The task board resident desktop application 633 may be resized by the user. For instance, the user can resize the task board resident desktop application by manually resizing the window by dragging a bottom edge up or down using an indicator such as a mouse pointer. The user may also resize the task board using the active region 612, as was previously discussed. When the task board resident desktop application is resized, the maximized resident desktop application(s) can also be resized to enable the task board resident desktop application to adjoin the maximized resident desktop application(s). The task board resident desktop application can include a scrollbar 616 to enable a user to scroll through rows of application icons 614 associated with open web applications.

In one embodiment, the task board resident desktop application 633 can be configured to show only the web applications that are operating in one or more resident desktop application(s) that are currently maximized. For instance, when the Power Bar resident desktop application 608 has been maximized, the task board resident desktop application can display the application icons associated with open web applications operating in the Power Bar resident desktop application.

In another embodiment, the task board resident desktop application 633 can be configured to show an application icon for every web application that has been opened in each resident desktop application that is operating on the web desktop. In this embodiment, each application icon can be displayed to identify which resident desktop application it is operating in. For instance, the application icons may be color coded, include a text display, or otherwise be encoded to contain information showing in which resident desktop application the web application is operating.

Figure 7:
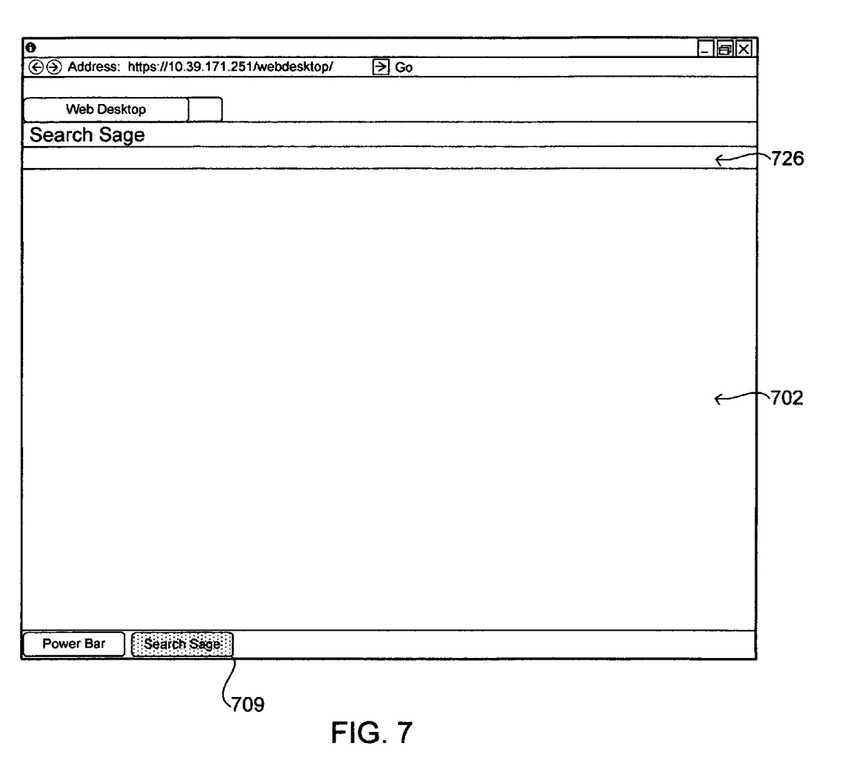
FIG. 7 illustrates an example of the Search Sage resident desktop application operating in the desktop environment in accordance with an embodiment of the present invention.

FIG. 7 illustrates one example of the Search Sage resident desktop application 709. The Search Sage resident desktop application is a persistent application that will only terminate when the web desktop is closed. The Search Sage resident desktop application provides the user an additional way of finding and opening a desired web application. In the Search Sage resident desktop application, a user can find a desired web application by typing key words into a text input box 726. In response to the text entered into the text input box, the Search Sage resident desktop application can provide a list of web applications associated with the text. A user can then select a desired web application to launch it in the work area 702.

Figure 8:
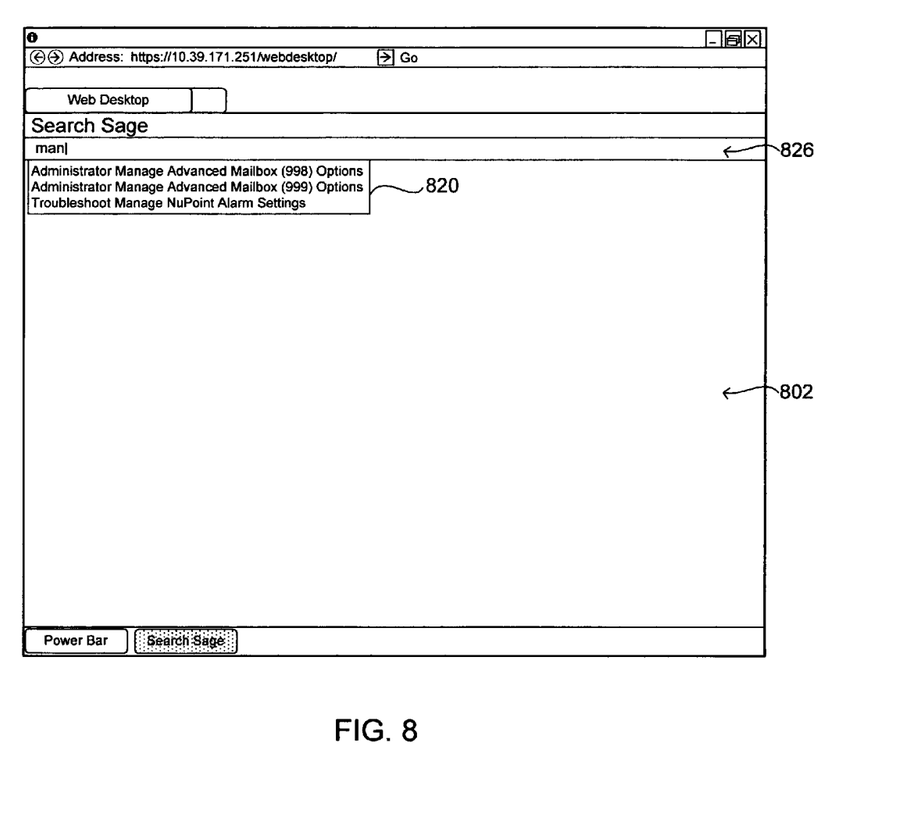
FIG. 8 illustrates an example of the Search Sage resident desktop application with text input into a text box in accordance with an embodiment of the present invention.

For instance, FIG. 8 provides an example in which a user may desire to manage a mailbox. The user can enter manage into the text input box 826. As the user begins to type, and enters the letters "man" in the text input box, the Search Sage can identify web applications relating to the letters in a selection box 820. In this example, the related web applications include an Administrator Manage Advanced Mailbox application for users 998 and 999. When a user selects one of the web applications listed in the selection box then the text in the text input box 826 is completed to include the entire name of the web application. The web application can then be launched in the work area 802.

Figure 9:
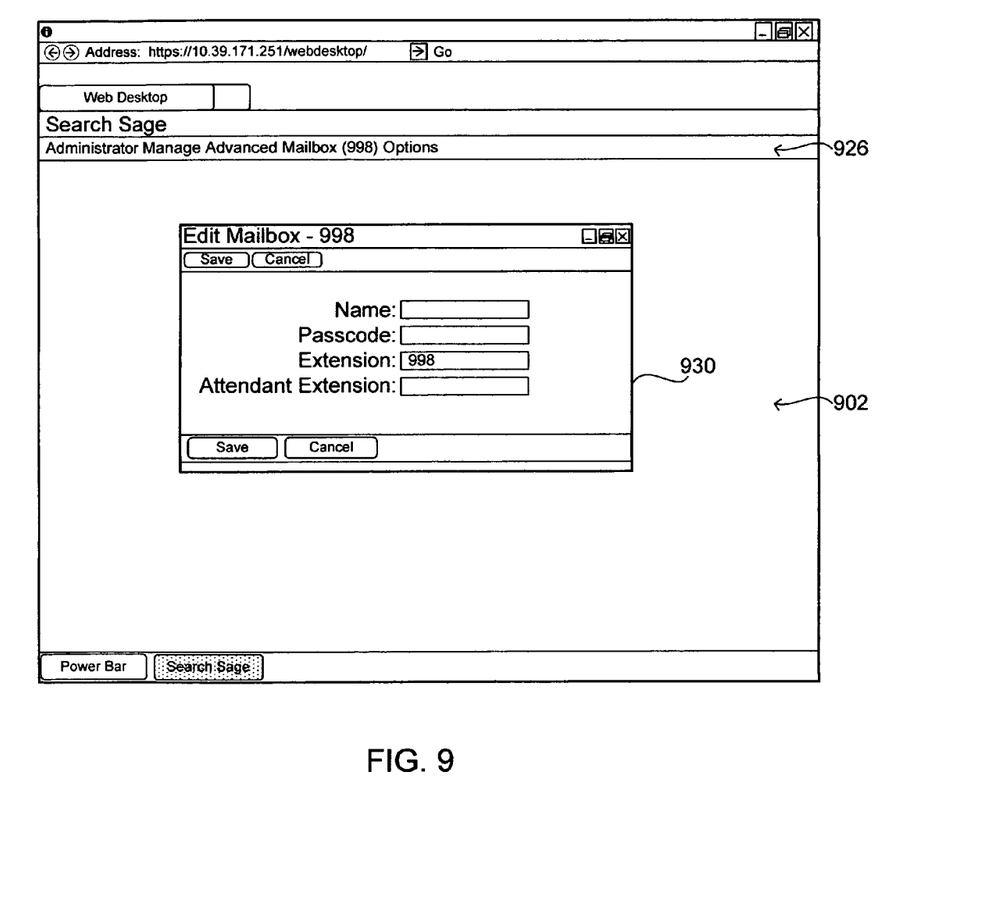
FIG. 9 illustrates an example of a web application launched in the Search Sage resident desktop application in accordance with an embodiment of the present invention.

FIG. 9 provides an example illustration of the associated web application 930 that has been launched and displayed in the work area 902. The text input box 926 shows the entire name of the web application. A user can manage Mailbox 998 as desired and then close the web application. The Search Sage resident desktop application can be configured to operate multiple web applications and display multiple windows simultaneously, as was discussed previously with respect to the Power Bar resident desktop application. The task board can be used to enable a user to control a display of the windows associated with the multiple web applications that can be opened within the Search Sage resident desktop application.

Figure 10:
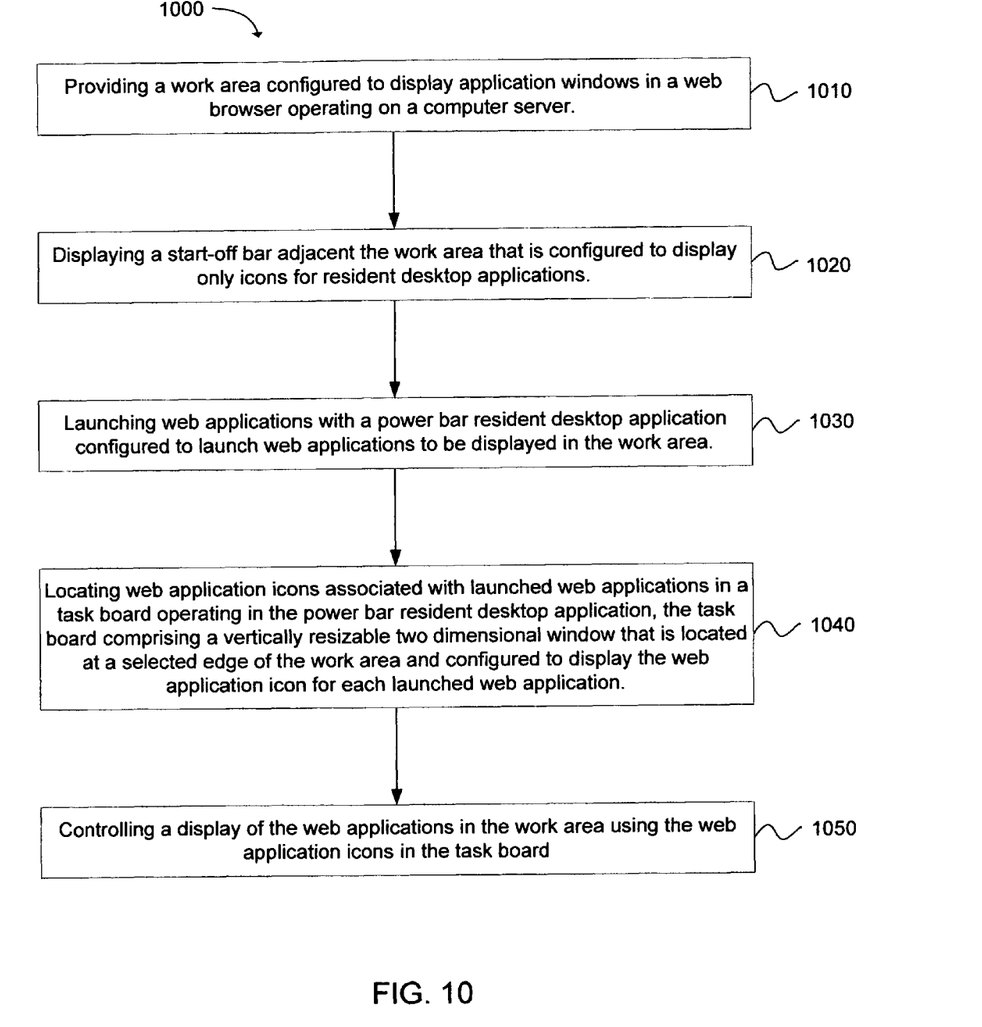
FIG. 10 illustrates a flow chart depicting a method for operating web applications in a web desktop environment in accordance with an embodiment of the present invention.

In accordance with one embodiment of the present invention, a method 1000 for operating web applications in a web desktop environment is disclosed, as depicted in the flow chart of FIG. 10. The method comprises providing 1010 a work area configured to display application windows in a web browser operating on a computer server. A resident application bar is displayed 1020 adjacent the work area. The resident application bar is configured to display only icons for resident desktop applications. Resident desktop applications are persistent applications that can only be terminated when the web desktop environment is terminated.

The method 1000 further comprises launching 1030 web applications with a power bar resident desktop application configured to launch web applications to be displayed in the work area. Web application icons associated with the launched web applications are located 1040 in a task board operating in the power bar resident desktop application. The task board comprises a vertically resizable two dimensional window that is located at a selected edge of the work area. The task board is configured to display the web application icon for each launched web application. The task board can include a vertical scrollbar to allow a user to scroll to view additional web application icons. A display of the web applications in the work area can be controlled 1050 using the web application icons in the task board.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Various techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A web based desktop environment, comprising:
 a display device for displaying;
 a work area configured to display application windows in a web browser operating on a computer server;
 a resident application bar displayed adjacent the work area and configured to display only icons for resident desktop applications and each resident desktop application is persistent and can only be terminated when the desktop environment is terminated;
 a power bar resident desktop application configured to launch web applications stored on a server, to be displayed in the work area; and
 a task board comprising a vertically resizable two dimensional window located at a selected edge of the work area and configured to display a web application icon for each launched web application.

2. The desktop environment of claim 1, further comprising a search sage resident desktop application configured to search for available web applications that are operable to launch in the web based desktop environment.

3. The desktop environment of claim 1, wherein each resident application bar icon for a selected resident desktop application can be used only to maximize and minimize a window in the work area that is associated with the resident desktop application.

4. The desktop environment of claim 1, wherein each web application icon in the task board is configured to allow a user to select at least one action for a window associated with a web application, the at least one action selected from the group consisting of maximizing the window, minimizing the window, closing the window, moving the window, and resizing the window.

5. The desktop environment of claim 1, wherein the power bar resident desktop application is configured to launch multiple temporal instances of a single web application.

6. The desktop environment of claim 1, wherein the task board is configured to be displayed in a closed position comprising a thin bar located at the selected edge of the work area with an active region that can be selected to open the task board to display the two dimensional window.

7. The desktop environment of claim 1, wherein the task board includes a vertical scroll bar in the two dimensional window to allow a user to scroll vertically to view additional web application icons related to active web applications.

8. The desktop environment of claim 1, wherein the task board is configured to operate as one of a separate resident desktop application and within at least one resident desktop application operating in the web based desktop environment.

9. A computer program product, comprising at least one non-transitory machine readable storage medium having a computer readable program code embodied therein, said computer readable program code adapted to be executed to implement a web based desktop environment, comprising:
 a work area configured to display application windows in a web browser operating on a computer server;
 a resident application bar displayed adjacent the work area and configured to display only icons for resident desktop applications, wherein each resident desktop application is persistent and can only be terminated when the desktop environment is terminated;

a power bar resident desktop application configured to launch web applications to be displayed in the work area; and a task board operating in the power bar resident desktop application, the task board comprising a vertically resizable two dimensional window located at a selected edge of the work area and configured to display a web application icon for each launched web application.

10. The desktop environment of claim 9, further comprising a search sage resident desktop application configured to search for available web applications that are operable to launch in the web based desktop environment.

11. The desktop environment of claim 9, wherein each resident application bar icon for a selected resident desktop application can be used only to maximize and minimize a window in the work area that is associated with the resident desktop application.

12. The desktop environment of claim 9, wherein each web application icon in the task board is configured to allow a user to select at least one action for a window associated with a web application, the at least one action selected from the group consisting of maximizing the window, minimizing the window, closing the window, moving the window, and resizing the window.

13. The desktop environment of claim 9, wherein the power bar resident desktop application is configured to launch multiple temporal instances of a single web application.

14. The desktop environment of claim 9, wherein the task board is configured to be displayed in a closed position comprising a thin bar located at the selected edge of the work area with an active region that can be selected to open the task board to display the two dimensional window.

15. The desktop environment of claim 9, wherein the task board includes a vertical scroll bar in the two dimensional window to allow a user to scroll vertically to view additional web application icons related to active web applications.

16. The desktop environment of claim 9, wherein the task board is configured to operate as one of a separate resident desktop application and within at least one resident desktop application operating in the web based desktop environment.

17. A method for operating web applications in a web desktop environment, comprising:

providing a work area configured to display application windows in a web browser operating on a computer server;

displaying a resident application bar adjacent the work area that is configured to display only icons for resident desktop applications;

launching web applications with a power bar resident desktop application configured to launch web applications to be displayed in the work area;

locating web application icons associated with launched web applications in a task board operating in the power bar resident desktop application, the task board comprising a vertically resizable two dimensional window that is located at a selected edge of the work area and configured to display the web application icon for each launched web application;

controlling a display of the web applications in the work area using the web application icons in the task board; and terminating resident desktop applications only when the web desktop environment is terminated.

18. The desktop environment of claim 17, further comprising launching web applications with a search sage resident desktop application configured to locate web applications based on a keyword search of available web applications to be launched in the web browser.

* * * * *